United States Patent
Asaba

(10) Patent No.: US 8,407,505 B2
(45) Date of Patent: Mar. 26, 2013

(54) POWER CONSUMPTION CONTROL METHOD IN MULTICORE CPU

(75) Inventor: Teppei Asaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 13/069,775

(22) Filed: Mar. 23, 2011

(65) Prior Publication Data

US 2011/0173477 A1 Jul. 14, 2011

Related U.S. Application Data

(63) Continuation of application No. PCT/JP2008/067203, filed on Sep. 24, 2008.

(51) Int. Cl.
G06F 1/00 (2006.01)

(52) U.S. Cl. ........................ 713/323; 713/324

(58) Field of Classification Search .................. None
See application file for complete search history.

(56) References Cited

U.S. PATENT DOCUMENTS

| | | | | |
|---|---|---|---|---|
| 8,301,923 B2 * | 10/2012 | Aoki | | 713/320 |
| 2007/0220294 A1 | 9/2007 | Lippett | | |
| 2007/0220517 A1 | 9/2007 | Lippett | | |
| 2007/0283128 A1 | 12/2007 | Hoshaku | | |
| 2010/0235662 A1 * | 9/2010 | Nishtala | | 713/322 |
| 2010/0299541 A1 * | 11/2010 | Ishikawa et al. | | 713/300 |
| 2012/0173907 A1 * | 7/2012 | Moses et al. | | 713/321 |

FOREIGN PATENT DOCUMENTS

| | | |
|---|---|---|
| JP | 11-282587 | 10/1999 |
| JP | 2002-351436 | 12/2002 |
| JP | 2004-38642 | 2/2004 |
| JP | 2007-133858 | 5/2007 |
| JP | 2007-531137 | 11/2007 |
| JP | 2007-328461 | 12/2007 |
| WO | 2005/096143 | 10/2005 |

OTHER PUBLICATIONS

International Search Report, mailed Dec. 16, 2008, in corresponding International Application No. PCT/JP2008/067203 (1 pg.).
Naoshi Higaki, "FR-V Family Processors for Media Solutions", Fujitsu.55,6, pp. 540-547, http://img.jp.fujitsu.com/downloads/jp/jmag/vol55-6/paper04.pdf.
ELPIDA Memory, Inc., "Partial Array Self Refresh (PASR)", Technical Note J0597E10 (Ver.1.0), (9 pp.) http://www.elpida.com/pdfs/J0597E10.pdf.
International Preliminary Report on Patentability, mailed Apr. 19, 2011, in International Application No. PCT/JP2008/067203 (4 pp.).

* cited by examiner

*Primary Examiner* — Kim Huynh
*Assistant Examiner* — Vincent Chang
(74) *Attorney, Agent, or Firm* — Staas & Halsey LLP

(57) ABSTRACT

A power consumption control method for a multicore CPU containing a plurality of cores each occupying a memory with partial array self refresh mode. The method includes making, when a core in the multicore CPU enters a power save mode, another core in the multicore CPU compress data in the memory occupied by the core entering the power save mode, store back compressed data in the memory, and control the memory to perform refresh operations to one or more banks retaining the compressed data.

6 Claims, 6 Drawing Sheets

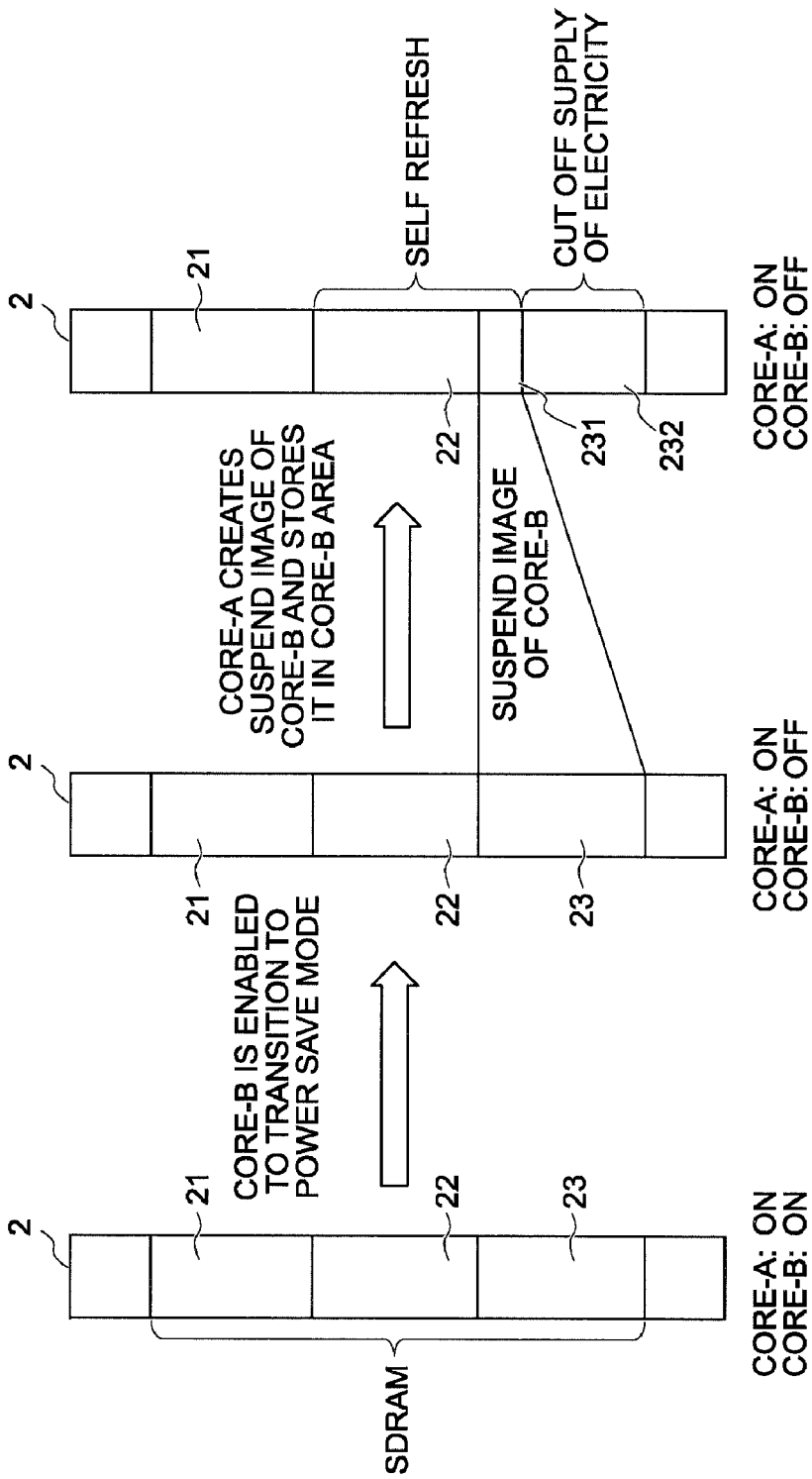

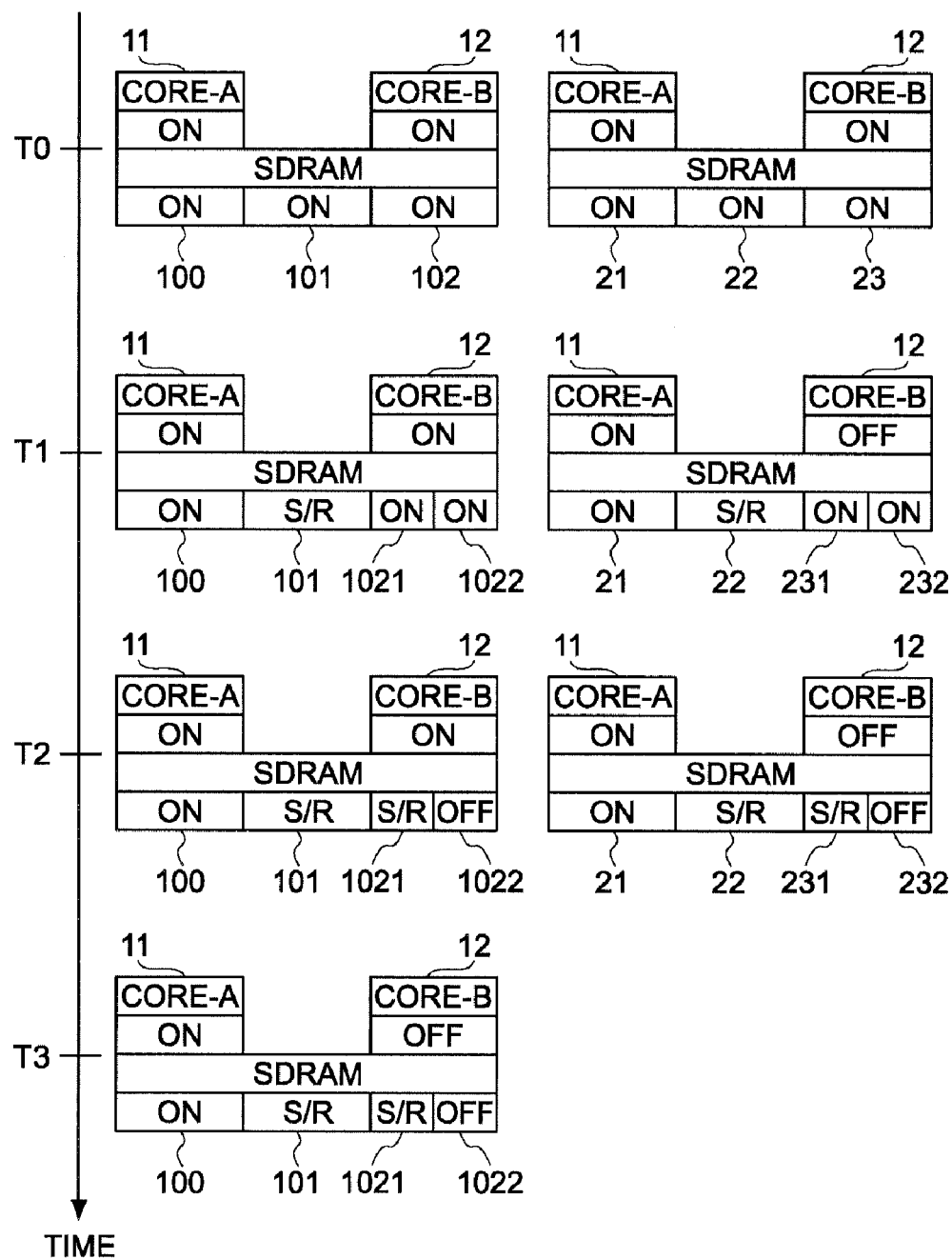

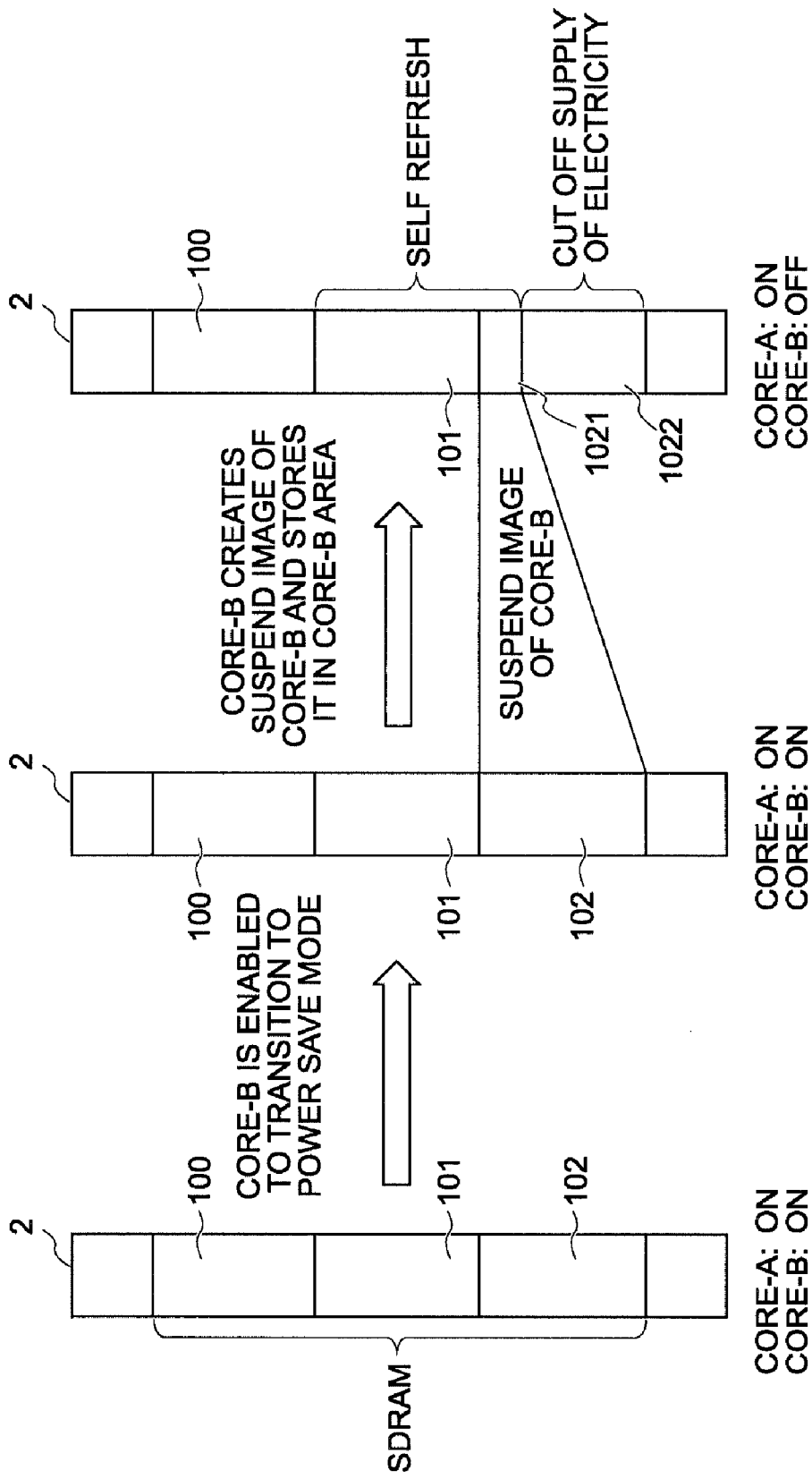

US 8,407,505 B2

POWER CONSUMPTION CONTROL METHOD IN MULTICORE CPU

CROSS-REFERENCE TO RELATED APPLICATIONS

This is a continuation of Application PCT/JP2008/067203, filed on Sep. 24, 2008, the contents of which are herein wholly incorporated by reference.

FIELD

The present invention relates to a power consumption control method, a power consumption control program and an information processing system for making one core transition to a power save mode from a normal mode in a multicore CPU.

BACKGROUND

In the majority of systems, power consumption of a CPU and a main memory accounts for approximately 40% of total power consumption of the whole system. It is therefore vital to scheme how much electric power of the CPU and the main memory is saved in terms of realizing power saving of the whole system. Such being the case, a variety of power saving technologies for the CPUs and the main memories have been proposed. For example, the schemes are a core sleep for reducing the power consumption by restraining clocks of a CPU core, a partial array self refresh for reducing the power consumption by supplying only an electric current sufficient for only banks required to retain data on an SDRAM while cutting off the supply of electricity to remaining banks, and so on.

Each of the conventional power saving technologies for the CPUs and the main memories is directed to a single-core CPU. Hence, any proposals which utilize advantages of a multicore CPU are not yet made, and there is no alternative but to apply respectively these power saving technologies on a core-by-core basis in the multicore CPU.

Thus, in the case of applying a partial array self refresh technology for the single-core CPU directly to the multicore CPU, it follows that the same transition time is required absolutely in the same procedures as in the case of applying the power saving technology to the single-core CPU, and hence there is nothing more than acquiring a decrease in power consumption quantity to the same degree as in the case of the single-core CPU.

SUMMARY

According to an aspect of the invention, a power consumption control method for a multicore CPU containing a plurality of cores individually receiving electricity and occupying a certain number of banks in a main storage as a working area, the main storage having a plurality of banks individually receiving electricity is defined as a method by which a core which is being enabled to transition to a power save mode cuts off supply of electricity to the core itself, another core creates a suspend image of the working area occupied by the core transitioning to the power save mode and stores the suspend image into a bank of the working area, and making, by the another core, the bank of the working area being used for storing the suspend image to enter a self refresh mode and cutting off supply of electricity to each remaining bank of the working area.

According to another aspect of the invention, a computer readable medium is stored with a program which, when executed by a multicore CPU containing a plurality of cores individually receiving electricity and occupying a certain number of banks in a main storage as a working area, the main storage having a plurality of banks individually receiving electricity, causes each of the cores to perform: notifying, when being enabled to transition to a power save mode, another core of transitioning to the power save mode and cutting off supply of electricity to the core itself; and creating, when being notified of the transitioning by another core, a suspend image of the working area of the another core, storing the suspend image back into the working area, making one or more banks of the working area, said banks being used for storing the suspend image, enter a self refresh mode and cutting off supply of electricity to each remaining bank of the working area.

According to still another aspect of the invention, an information processing system comprises: a storage unit having a plurality of storage regions individually supplied with electricity; a multicore processor having a plurality of cores individually occupying a certain number of storage regions in the storage unit as a working area; and a power supply unit to supply electricity to the multicore processor and the storage unit. Further, each of the cores in the multicore processor of the information processing system performs: notifying, when transitioning to a power save mode, another core of transitioning to the power save mode and cutting off supply of electricity to the core itself; and creating, when being notified of transitioning to the power save mode by another core, a suspend image of a working area occupied by the another core, storing the suspend image back into a bank of the working area, making one or more storage regions of the working area being used for storing the suspend image to enter a self refresh mode and cutting off supply of electricity to each remaining storage region of the working area.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 4 is a diagram illustrating how a status of an SDRAM changes in the course of transitioning to the power save mode from the normal mode;

FIG. 5 is a timing chart illustrating respective stages of transitioning to the power save mode from the normal mode in comparison with partial array self refresh in a single-core CPU; and FIG. 6 is a diagram illustrating how the status of the SDRAM changes in the course of transitioning to the power save mode from the normal mode due to the partial array self refresh in the single-core CPU.

DESCRIPTION OF EMBODIMENTS

An embodiment of the present invention will hereinafter be described with reference to the drawings.

[Hardware Configuration]

Figure 1:
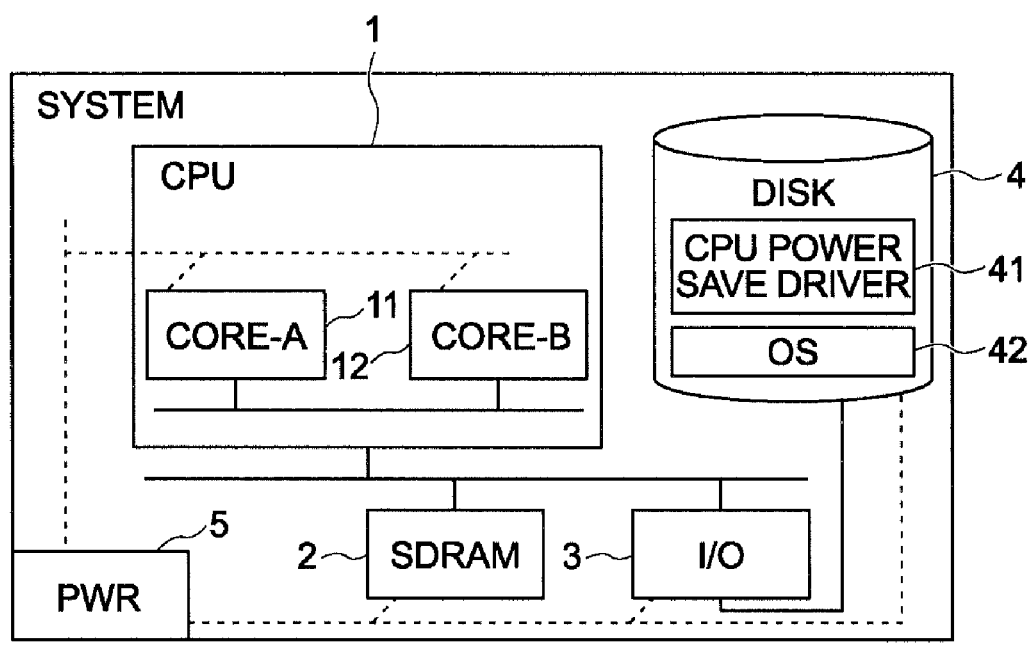
FIG. 1 is a schematic block diagram illustrating a system including a multicore CPU to which an embodiment of the invention is applied.

FIG. 1 is a block diagram illustrating an outline of a configuration of a system including a multicore CPU to which a power consumption control method according to an embodiment of the invention is applied. As a matter of course, the present invention can be, as far as being equipped with a chip containing a plurality of cores, applied to systems having whatever hardware configurations, systems provided with chips of the multicore CPUs having whatever configurations and systems using whatever types of OSs, and hence FIG. 1 illustrates nothing but one example of the system. For example, the multicore CPU is classified hardwarewise into the CPU containing the plurality of cores having absolutely the same configuration (symmetric cores) and the CPU containing the plurality of asymmetric cores. The present invention can be applied to both of these configurations. Note that, in a sense that operation contents on the occasion of transitioning to a power save mode differ in a transition target core (slave) and in another core (master), the multicore CPU to which the present invention is applied is called an "asymmetric multicore CPU" as the case may be.

The system illustrated in FIG. 1 is equipped with a multicore CPU 1; an SDRAM 2 and an I/O 3 connected to a bus for transferring and receiving instructions and data to and from respective cores 11, 12 of the multicore CPU 1; a hard disk 4 connected to the I/O 3; and a power supply circuit 5 for supplying electric power to these respective components.

The multicore CPU 1 in the present example is equipped with the two symmetric cores (core-A 11, core-B 12) each having the same memory map. Each of cores is therefore capable of viewing the whole areas of the SDRAM 2 which will be described later. Note that any inconvenience may not be caused by making the respective cores 11, 12 asymmetric hardwarewise.

The SDRAM 2 is a main storage device on which working areas of the respective cores 11, 12 of the multicore CPU 1 are reserved. The SDRAM 2 has a storage area consisting of a plurality of banks supplied individually with electricity from the power supply circuit. As illustrated in FIG. 4, some proportions of the storage area of the SDRAM 2 are reserved as a core-A area 21 used for the operation solely by the core-A 11, a core-B area 23 used for the operation solely by the core-B 12, and a shared area 22 shared by the two cores 11, 12 for mutual communications and the like by an OS 42 which will be explained later on. Note that each of the areas 21-23 is constructed of a plurality of banks, supports a partial array self refresh, and is powered ON/OFF on a bank-by-bank basis. Further, the shared area 22 is, if capable of performing the inter-core communications by a technique using none of the shared area, becomes unnecessary.

The I/O 3 is an interface with a variety of external devices from the disk device 4 down.

The disk device 4 is a nonvolatile storage device that retains a variety of programs and data files. The variety of programs stored in this disk device 4 include a CPU power save driver 41 in addition to the OS (Operation System) 42 defined as a basic program for enabling the cores 11, 12 of the multicore CPU 1 to operate the respective units of the system. Each of the cores 11, 12, which reads the CPU power save driver 41, executes, based on the CPU power save driver 41, a process corresponding to whether the core itself is the power save mode transition target core or not, whereby the power consumption control according to the embodiment of the present invention is executed. Note that the process executed by each core represents a process executed by the "master" that manages the power saving of the whole system if the core itself is not the power save mode transition target core, and represents a process executed by the "slave" if the core itself is the power save mode transition target core, respectively.

The power supply circuit 5 is a circuit which supplies the drive power to each of the components from the cores 11, 12 of the multicore CPU 1 down. The electric power supplied to each of the banks of the cores 11, 12 and the SDRAM 2 from the power supply circuit 5 is switched ON/OFF or switched over to a minimum quantity required for retaining the data (self refresh mode) under the control of any one of the cores 11, 12.

[Processing Contents]

Processes executed by the cores 11, 12 each of which reads the CPU power save driver 41 will hereinafter be described with reference to flowcharts of FIGS. 2 and 3 and FIG. 4.

[Process When Transitioning to Power Save Mode from Normal Mode]

Figure 2:
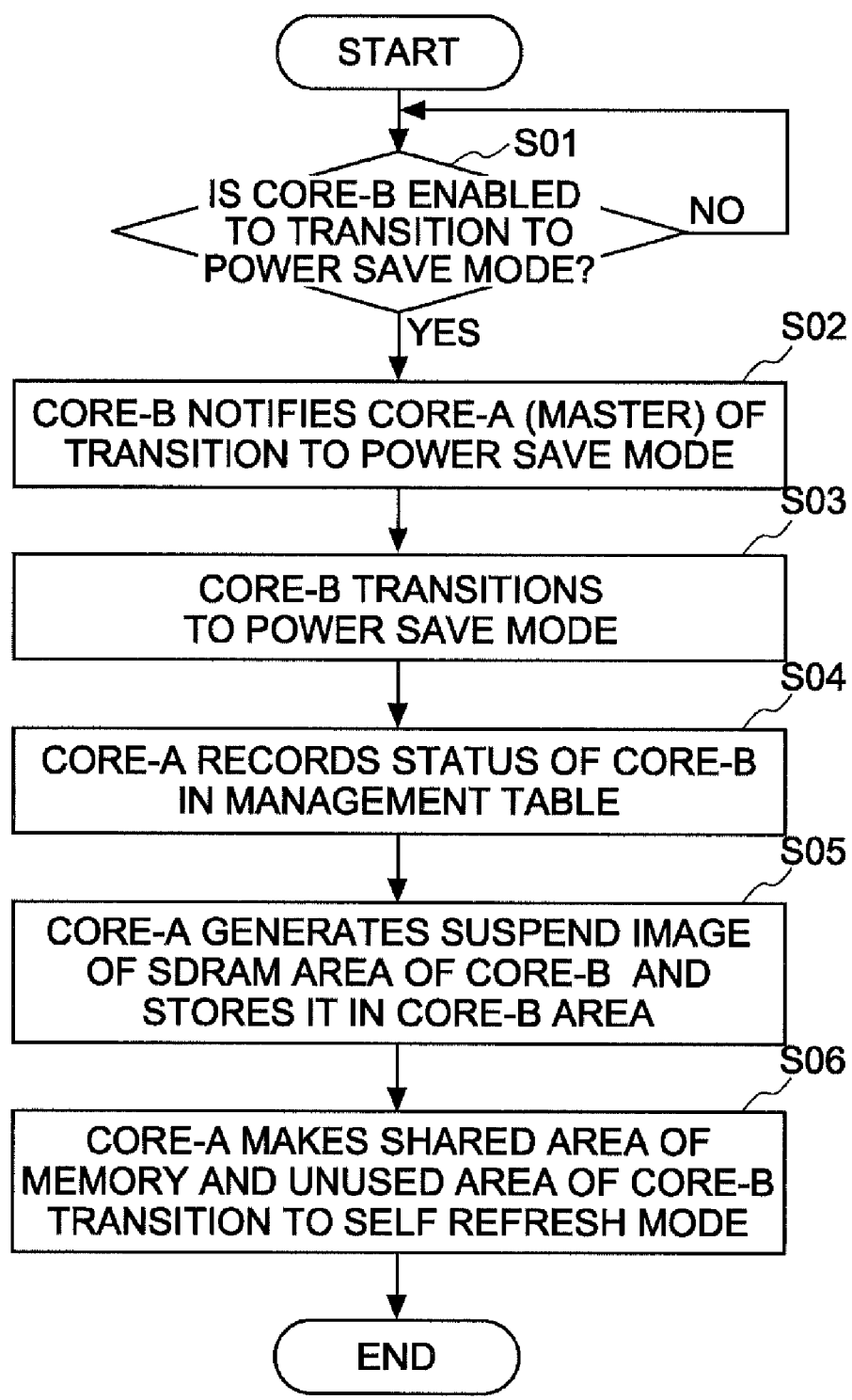
FIG. 2 is a flowchart illustrating a process executed by each core in order to transition to a power save mode from a normal mode on the basis of a CPU power save driver.

As illustrated in FIG. 2, each of the cores 11, 12 reads, when the multicore CPU is activated, the CPU power save driver 41 and continues to perform a self-diagnosis as to whether enabled to transition to the power save mode (S01). Note that determination as to whether enabled to transition to the power save mode is made based on whether each core satisfies a predetermined transition condition, e.g., a condition of whether a CPU usage ratio is equal to or smaller than a predetermined threshold value over a fixed period of time.

Then, as illustrated in FIG. 4A, if any one of the cores, in advance of the other core, makes the self-diagnosis saying that the self-core is enabled to transition to the power save mode, the self-core notifies the other core of transitioning to the power save mode (S02). Hereafter, the notification sender core behaves as the "slave", while the notification recipient core behaves as the "master". For the convenience's sake, the following discussion will be made on the assumption that the core-B determines that the self-core is enabled to transition to the power save mode in advance of the core-A, and the core-B notifies the core-A of the transition to the power save mode, i.e., the master is the core-A and the slave is the core-B, however, if the core-A makes the self-diagnosis saying that the self-core is enabled to transition to the power save mode earlier, as a matter of course, the core-A becomes the slave, while the core-B becomes the master.

Subsequently, the core-B 12 behaving as the slave transitions to the power save mode by, as illustrated in FIG. 4B, switching OFF the power supplied to the self-core from the power supply circuit 5 (S03). Note that the process in S03 and processes in S04 through S06 which will be described later on are to be executed in parallel because of the cores executing the respective processes being separate.

The core-A 11 behaving as the master, which receives the notification of the transition to the power save mode from the core-B 11, generates a management table in a core-A area 21, dedicated to the self-core, of the SDRAM 2 and records a status of the core-B, i.e., it is in the power save mode, in the management table (S04).

Subsequently, as illustrated in FIG. 4C, the core-A 11, by compressing the memory data in the core-B area 23 dedicated to the core-B of the SDRAM 2, creates a suspend image of the core-B area 23, and stores the suspend image in some banks 231 in the core-B area 23 (S05).

Subsequently, the core-A 11 makes the some banks 231 in the core-B area 23 and the shared area 22 on the SDRAM 2 transition to the power save mode (S06). Namely, the electric power supplied to the respective banks configuring these areas 231, 22 from the power supply circuit 5 is restricted to the minimum quantity required for retaining the data. Together with this operation, the core-A 11 switches OFF the power supply to the remaining banks 232 in the core-B area 23.

Note that, if the core-A 12 itself behaving as the master makes the self-diagnosis of being enabled to transition to the power save mode after the core-B 11 has made the self-diagnosis of being enabled to transition to the power save mode, the core-A 12, after executing S06, transitions to the self refresh mode according to the same procedures as the procedures of the single-core CPU.

[Processes When Transitioning to Normal Mode from Power Save Mode]

Figure 3:
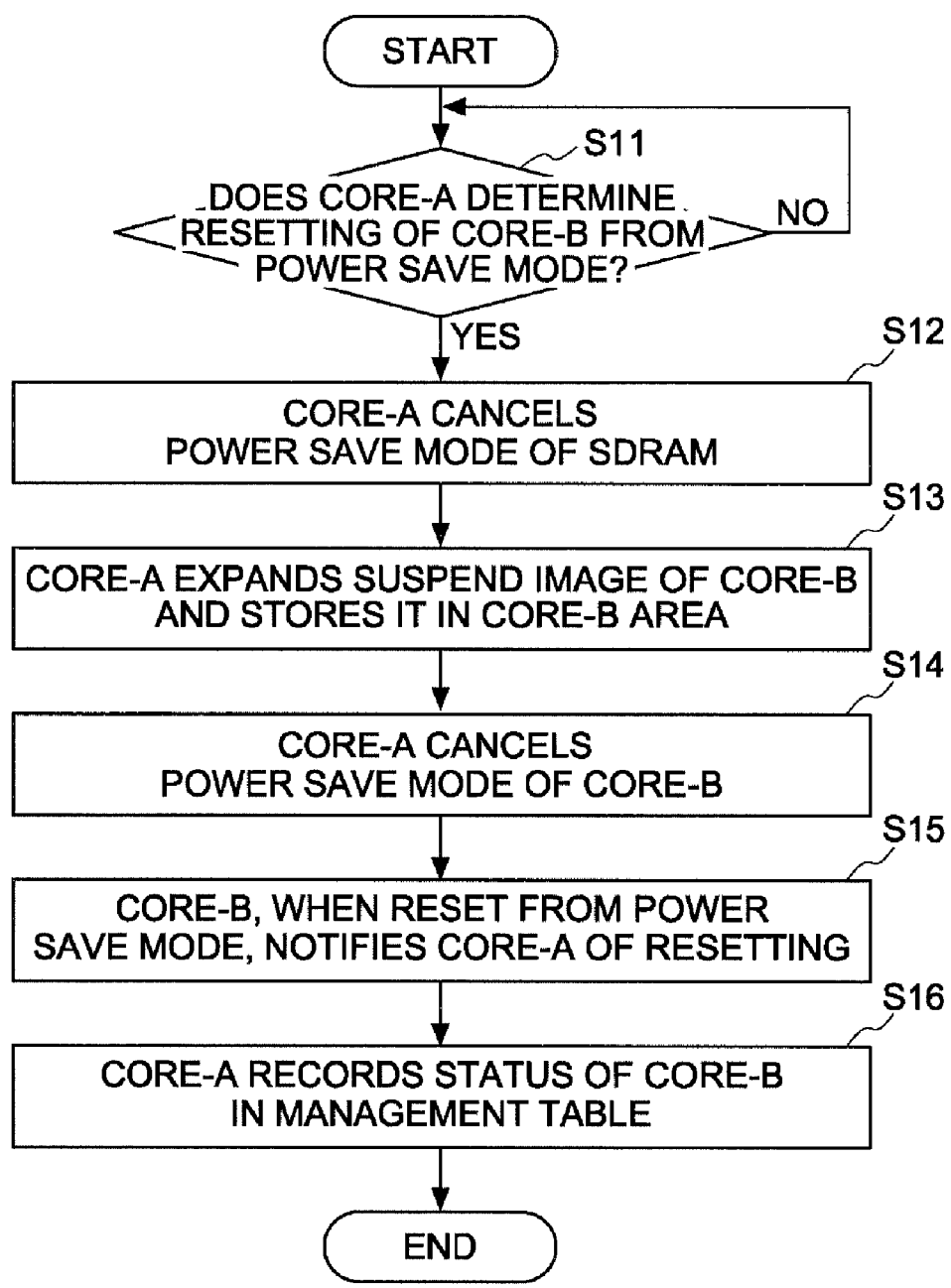
FIG. 3 is a flowchart illustrating a process executed by each core in order to reset to the normal mode from the power save mode on the basis of the CPU power save driver.

Next, as illustrated in FIG. 3, when the core-All determines to reset the core-B 12 to the normal mode from the power save mode due to a startup of a specific application (S11), the core-A 11 cancels the power save mode of the SDRAM 2, i.e., resets back ON the power supply to all of the banks of the shared area 22 and the core-B area 23 (S12). Thereafter, the core-A expands the suspend image of the core-B 12 that has been stored so far in the some banks 231 in the core-B area 23, stores the suspend image back in the whole core-B area 23 (S13), and cancels the power save mode of the core-B 12, i.e., resets back ON the power supply to the core-B 12 (S14).

When the core-B 12 is thus reset from the power save mode, the core-B 12 notifies the core-A 11 of the resetting (S15).

Upon receiving the notification from the core-B, the core-A 11 records the status of the core-B, i.e., it is in the normal mode, into the management table in the core-A area of the SDRAM 2 (S16).

COMPARATIVE EXAMPLE

FIG. 6 illustrates how the status of the SDRAM changes in the case of applying a single-core partial array self refresh technique to the multicore CPU. Namely, as illustrated in FIG. 6, in the SDRAM, an area (core-A area) 100 occupied for the operation of one core (core-A), an area (core-B area) 102 occupied for the operation of the other core (core-B) and a shared area 101 used for the communications between these two cores are reserved. In order for one core (core-B) to transition to the power save mode from the normal mode illustrated in FIG. 6A, the core-B itself creates the suspend image by compressing the memory data in the core-B area 102 at a stage of FIG. 6B. Then, the core-B, after saving the suspend image in the some banks 1021 of the core-B area 102 as illustrated in FIG. 6C, supplies the electric power for self refresh to the some banks 231 and the shared area 22 and cuts off the supply of electricity to the core-B itself after cutting off the supply of electricity to the remaining banks 1022 of the core-B area 102.

Advantages of the Power Consumption in the Embodiment

Next, a power consumption management method in the multicore CPU configured as discussed above according to the embodiment will hereinafter be described in comparison with a method of applying the partial array self refresh technique in the single-core CPU to the multicore CPU illustrated in FIG. 6.

FIG. 5 is a timing chart depicting the transition of the status of the SDRAM 2 along the time axis (the vertical axis) in the case of being based on the two methods.

In FIG. 5, a left column represents the transition of the status of the SDRAM 2 along the time-base according to the method of diverting, to the multicore CPU, the partial array self refresh technique in the single-core CPU, while a right column represents the transition of the status of the SDRAM 2 along the time-base according to the power consumption management method in the multicore CPU 1 in the embodiment.

As depicted in the right column in FIG. 5, when the core-B 12 of this embodiment performs the self-diagnosis of being enabled to transition to the power save mode at timing T0, the core-B 11, which is going to transition to the power save mode, executes at the next timing T1 the process of switching off the power supply to itself (S03). In parallel with the process of core-B 11, the core-A 12 executes a process of creating the suspend image of the core-B 11 and storing the suspend image in the some banks 231 within the core-B area 23 (S05) and a process of making the shared area 22 transition to the self refresh mode (S/R) (S06). By contrast, in the case of diverting the partial array self refresh technique in the single-core CPU to the multicore CPU, the core-B 12 itself must execute all of the processes. Therefore, as depicted in the left column in FIG. 5, at the timing T1, the process of creating the suspend image and storing the suspend image in the some banks 1021 within the core-B area 102 and the process of making the shared area 101 transition to the self refresh mode (S/R) can be executed, but switching off the power supply to the core-B 12 cannot be executed.

In either case, at the next timing T2, the some banks 1021, 231 stored with the suspend images and the shared areas 101, 22 are transitioned to the self refresh mode (S/R) and the remaining banks 1022, 232 of the core-B areas 102, 23 is turned OFF. That is, according to the embodiment, the transition to the power save mode is all completed at the timing T2. By contrast, according to the partial array self refresh technique in the single-core CPU, a process of switching OFF the power supply by making the core-B 12 itself transition to the power save mode must further be executed at the next timing T3.

Thus, according to the present embodiment, the transition to the power save mode can be completed at much earlier timing than by the method of diverting the partial array self refresh technique in the single-core CPU to the multicore CPU. It is therefore feasible to reduce the power consumption quantity to a degree corresponding to the earliness in time. Then, the effect in reducing the power consumption quantity becomes larger as the multicore CPU has a greater number of cores.

A core itself may perform a self-diagnosis as to whether this core gets enabled to transition to the power save mode or not, and another core may make the diagnosis. In the case where the core itself performs the self-diagnosis, it is necessary to, before executing a process of switching off the power supply to the self-core, notify another core functioning as a master of this fact, as a means for which, a shared area on a main storage or a CPU interrupt may be used. Accordingly, in the case of giving the notification by use of the shared area on the main storage, it is indispensable to reserve the shared area on the main storage, and hence, if all of the cores other than the core functioning as the master transition to the power save mode, it is desirable that even the banks configuring the shared area transition to the self refresh mode.

Further, the function as the master may be fixed to a specified core and may be handed around among the cores. For example, if there is a difference in throughput between the cores, it is desirable as the case may be that the function as the master be fixed to the core exhibiting the higher throughput, and, whereas if there is no difference in throughput between the cores, it is desirable as the case may be that the core enabled to transition to the power save mode earlier functions as a slave while another core functions as the master.

Moreover, if the respective cores are asymmetric hardwarewise and if a throughput of the core functioning as the master is higher than the throughput of the core functioning as the slave, the slave can transition to the power save mode much earlier, and hence there is the increased effect in reducing the power consumption quantity. In this case, it is desirable that the function as the master be fixed to the core having the high throughput.

Further, according to the embodiment, the power consumption is controlled by the CPU power save driver 41 defined as add-in software executed on the OS, and therefore, even if the OS 42 executed on the core set as the transition target core to the power save mode does not support the power save mode, it is possible to make this core transition to the power save mode.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A power consumption control method for a multicore CPU containing a plurality of cores individually receiving electricity and occupying a certain number of banks in a main storage as a working area, the main storage having a plurality of banks individually receiving electricity, by which
    a core which is being enabled to transition to a power save mode cuts off supply of electricity to the core itself,
    another core creates a suspend image of the working area occupied by the core transitioning to the power save mode and stores the suspend image into a bank of the working area, and
    making, by the another core, the bank of the working area being used for storing the suspend image to enter a self refresh mode and cutting off supply of electricity to each remaining bank of the working area.

2. A power consumption control method according to claim 1, wherein
    the core transitioning to the power save mode notifies the another core of transitioning to the power save mode, and
    the another core being notified of the transitioning creates the suspend image of the working area occupied by the core notifying the another core of the transitioning.

3. A power consumption control method according to claim 2, wherein
    the another core notified of the transitioning makes a shared area defined as a bank of the main storage shared with the respective cores to enter the self refresh mode when making the bank used for storing the suspended image enter the self refresh mode.

4. A non-transitory computer readable media stored with a program which, when executed by a multicore CPU containing a plurality of cores individually receiving electricity and occupying a certain number of banks in a main storage as a working area, the main storage having a plurality of banks individually receiving electricity, causes each of the cores to perform:
    notifying, when being enabled to transition to a power save mode, another core of transitioning to the power save mode and cutting off supply of electricity to the core itself; and
    creating, when being notified of the transitioning by another core, a suspend image of the working area of the another core, storing the suspend image back into the working area, making one or more banks of the working area, said banks being used for storing the suspend image, enter a self refresh mode and cutting off supply of electricity to each remaining bank of the working area.

5. An information processing system comprising:
    a storage unit having a plurality of storage regions individually supplied with electricity;
    a multicore processor having a plurality of cores individually occupying a certain number of storage regions in the storage unit as a working area; and
    a power supply unit to supply electricity to the multicore processor and the storage unit,
    wherein each of the cores performs:
    notifying, when transitioning to a power save mode, another core of transitioning to the power save mode and cutting off supply of electricity to the core itself; and
    creating, when being notified of transitioning to the power save mode by another core, a suspend image of a working area occupied by the another core, storing the suspend image back into a bank of the working area, making one or more storage regions of the working area being used for storing the suspend image to enter a self refresh mode and cutting off supply of electricity to each remaining storage region of the working area.

6. An information processing system according to claim 5, wherein the core notified of the transitioning creates the suspend image by compressing information stored within the working area of the another core.

* * * * *